United States Patent
Hou et al.

(10) Patent No.: US 11,380,126 B1
(45) Date of Patent: Jul. 5, 2022

(54) DISPLAY DEVICE WITH EMBEDDED BIOMETRIC DETECTION FUNCTION IN ACTIVE REGION

(71) Applicant: HIMAX TECHNOLOGIES LIMITED, Tainan (TW)

(72) Inventors: Zong-You Hou, Tainan (TW); Yaw-Guang Chang, Tainan (TW); Jia-Ming He, Tainan (TW); Wei-Hsien Yeh, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/168,149

(22) Filed: Feb. 4, 2021

(51) Int. Cl.
*G06V 40/13* (2022.01)
(52) U.S. Cl.
CPC .................. *G06V 40/1318* (2022.01)
(58) Field of Classification Search
None
See application file for complete search history.

(56) References Cited

U.S. PATENT DOCUMENTS

| | | | |
|---|---|---|---|
| 2017/0205958 A1* | 7/2017 | Kurasawa | G06F 3/0445 |
| 2017/0293791 A1* | 10/2017 | Mainguet | G06K 9/00087 |
| 2018/0114815 A1* | 4/2018 | Lee | H01L 51/50 |
| 2018/0211086 A1* | 7/2018 | Liu | G06K 9/00355 |

\* cited by examiner

*Primary Examiner* — Joseph R Haley
(74) *Attorney, Agent, or Firm* — CKC & Partners Co., LLC

(57) ABSTRACT

A display device is disclosed, which includes a display panel and a detection circuit. The display panel has pixels configured to display an image. The pixels include display and photo sensing pixels that are arranged in sensing channels. Each display and photo sensing pixel includes a display region and a photo sensing region. The display region emits light. The photo sensing region detects the light emitted by the display region and reflected from a biometric object and to convert the reflected light into photo detection signals. The detection circuit has differential signal processing circuitries that are coupled to the photo sensing regions of the display and photo sensing pixels. Each differential signal processing circuitry performs a differential operation on the photo detection signals of adjacent two of the sensing channels to generate a difference signal that is used to construct a biometric pattern corresponding to the biometric object.

11 Claims, 17 Drawing Sheets

DISPLAY DEVICE WITH EMBEDDED BIOMETRIC DETECTION FUNCTION IN ACTIVE REGION

BACKGROUND

Field of the Invention

The invention relates to a display device, and more particularly to a display device with an embedded biometric detection function in an active region thereof.

Description of Related Art

For the conventional electronic products, biometric detection technologies have been widely applied for various applications, such as identity verification, access control, or the like. For example, more and more conventional mobile phones or tablets are equipped with a fingerprint recognition function to conveniently identify a person. However, a fingerprint recognition IC has to be arrange in a non-active region of a mobile phone to avoid affecting original image display, and thus how to arrange the fingerprint recognition IC in the non-active region of such mobile phone according to a design requirement has to be taken into consideration.

SUMMARY

One aspect of the invention directs to a display device which includes a display panel and a detection circuit. The display panel has pixels that are configured to display an image. The pixels include display and photo sensing pixels that are arranged in sensing channels. Each display and photo sensing pixel includes a display region and a photo sensing region. The display region is configured to emit light. The photo sensing region is configured to detect the light emitted by the display region and reflected from a biometric object and to convert the reflected light into photo detection signals. The detection circuit has first differential signal processing circuitries that are coupled to the photo sensing regions of the display and photo sensing pixels. Each first differential signal processing circuitry is configured to perform a differential operation on the photo detection signals of adjacent two of the sensing channels to generate a difference signal that is used to construct a biometric pattern corresponding to the biometric object.

In accordance with one or more embodiments of the invention, the detection circuit further includes a second differential signal processing circuitry that is configured to perform a differential operation on a voltage reference signal and the photo detection signal of the first photo sensing channel of the photo sensing channels to generate a first output reference signal for constructing the biometric pattern.

In accordance with one or more embodiments of the invention, the detection circuit further includes an accumulator that is configured to perform accumulative operations on the first output reference signal and the difference signals to restore the photo detection signals relative to the voltage reference signal.

In accordance with one or more embodiments of the invention, the detection circuit further includes a third differential signal processing circuitry that is configured to perform a differential operation on the voltage reference signal and the photo detection signal of the last photo sensing channel of the photo sensing channels to generate a second output reference signal for constructing the biometric pattern.

In accordance with one or more embodiments of the invention, the detection circuit further includes an interpolator for performing interpolating operations on the difference signals based on the difference between the first and second output reference signals.

In accordance with one or more embodiments of the invention, each first differential signal processing circuitry further includes an analog-to-digital (A/D) converter and a digital filter. The A/D converter is configured to convert the difference signal from an analog form to a digital form. The digital filter is coupled to an output of the A/D converter, and is configured to define regions corresponding to two opposite characteristics of the biometric object to generate a biometric image.

In accordance with one or more embodiments of the invention, the photo sensing region is an active photo sensing region that comprises a photodiode, a source follower transistor and a select transistor.

In accordance with one or more embodiments of the invention, the photo sensing region is a passive photo sensing region that comprises a photodiode and a select transistor.

In accordance with one or more embodiments of the invention, the display panel is a liquid crystal display (LCD) panel, and the display device further comprises a backlight module that is configured to provide backlight to the LCD panel.

In accordance with one or more embodiments of the invention, the pixels are organic light-emitting diode (OLED), micro light-emitting diode ($\mu$LED) pixels of mini-LED pixels.

Another aspect of the invention is directed to a biometric detection method of a display device which has a display panel with pixels for display, the pixels include of display and photo sensing pixels that are arranged in photo sensing channels, and the biometric detecting method includes: emitting light by a display region of each of the display and photo sensing pixels; detecting the light emitted by the display region and reflected from a biometric object and to convert the reflected light into photo detection signals; performing first differential operations on the photo detection signals in units of adjacent two of the photo sensing channels to generate difference signals; and constructing a biometric pattern corresponding to the biometric object based on the difference signals.

In accordance with one or more embodiments of the invention, the method further includes: performing a second differential operation on a voltage reference signal and the photo detection signal of the first photo sensing channel of the photo sensing channels to generate a first output reference signal for constructing the biometric pattern; and constructing the biometric pattern corresponding to the biometric object based on the difference signals and the first output reference signal.

In accordance with one or more embodiments of the invention, the operations of constructing the biometric pattern includes: performing accumulative operations on the first output reference signal and the difference signals to restore the photo detection signals relative to the voltage reference signal.

In accordance with one or more embodiments of the invention, the method further includes: performing a third differential operation on the voltage reference signal and the photo detection signal of the last photo sensing channel of the photo sensing channels to generate a first output reference signal for constructing the biometric pattern; and constructing the biometric pattern corresponding to the biometric object based on the difference signals and the first and second output reference signals.

In accordance with one or more embodiments of the invention, the operations of constructing the biometric pattern includes: performing interpolating operations on the difference signals based on the difference between the first and second output reference signals.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

DETAILED DESCRIPTION

Figure 1:
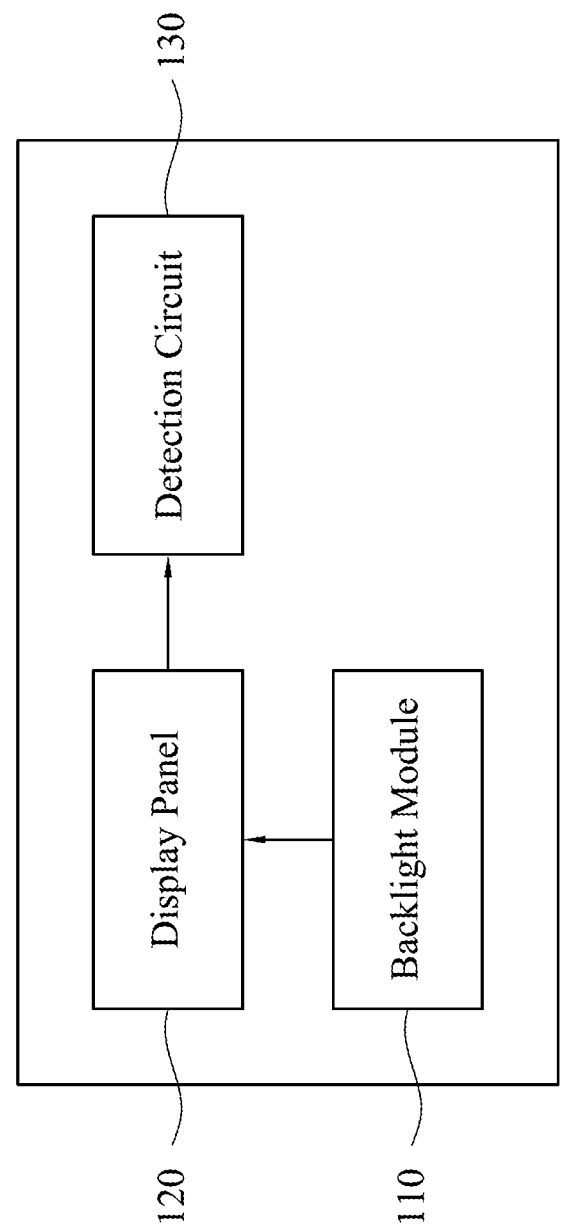
FIG. 1 is a schematic diagram of a display device in accordance with some embodiments of the invention.

The detailed explanation of the invention is described as following. The described preferred embodiments are presented for purposes of illustrations and description, and they are not intended to limit the scope of the invention.

Terms used herein are only used to describe the specific embodiments, which are not used to limit the claims appended herewith. Unless limited otherwise, the term "a," "an," "one" or "the" of the single form may also represent the plural form.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

It will be understood that, although the terms "first," "second," "third" . . . etc., may be used herein to describe various elements, components and/or signals, these elements, components and/or signals, should not be limited by these terms. These terms are only used to distinguish elements, components and/or signals.

The document may repeat reference numerals and/or letters in the various examples. This repetition is for the purpose of simplicity and clarity and does not in itself dictate a relationship between the various embodiments and/or configurations discussed.

Referring to FIG. 1, FIG. 1 is a schematic diagram of a display device 100 in accordance with some embodiments of the invention. The display device 100 may be, for example, a liquid crystal display (LCD) of twisted menatic (TN) type, vertical alignment (VA) type, in-plane switching (IPS) type, fringe-field switching (FFS) type, or the like. The display device 100 includes a backlight module 110, a display panel 120 and a detection circuit 130. The backlight module 110 is configured to provide backlight to the display panel 120 for display as well as biometric detection. The backlight module 110 may have a backlight source (not shown) that is configured to emit backlight and a light guide plate (not shown) that is disposed to guide the backlight to penetrate into the display panel 120. The backlight source (not shown) may be one or more light-emitting diodes (LEDs), one or more cold cathode fluorescent lamps (CCFLs), or another suitable backlight source. The backlight generated by the backlight source (not shown) may be white light, red light, greed light, blue light, or the like. In addition, the light guide plate (not shown) may have a reflector film, microstructures and/or another element to change the light propagation path therein.

Figure 2:
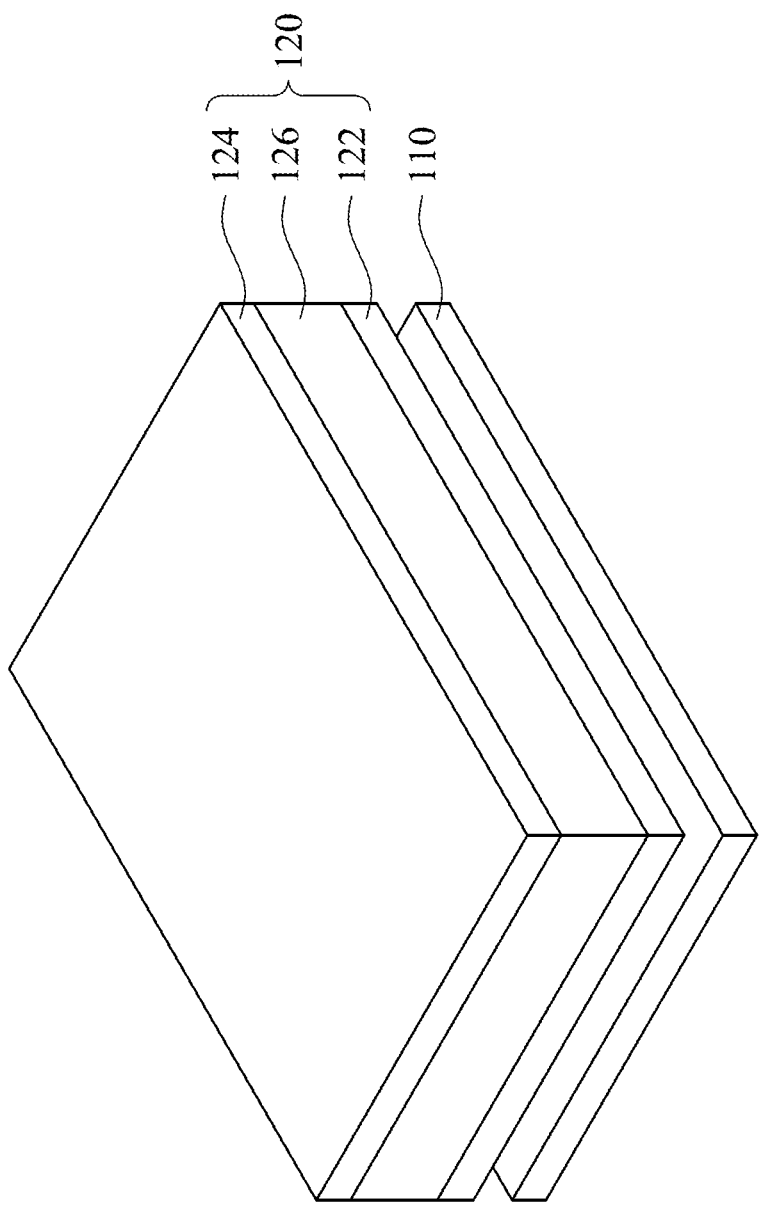
FIG. 2 is an exemplary structural view of the backlight module and the display panel in FIG. 1.

Also referring to FIG. 2, which is an exemplary structural view of the backlight module 110 and the display panel 120. The display panel 120 is disposed on the backlight module 110, such that the bottom of the display panel 120 receives the backlight from the backlight module 110. In some embodiments, as shown in FIG. 2, the display panel 120 includes an active matrix substrate 122, a color filter substrate 124 and a liquid crystal layer 126. The active matrix substrate 122 includes pixels that are arranged in a matrix. The color filter substrate 124 is disposed opposite to the active matrix substrate 122, and the liquid crystal layer 126 is interposed between the active matrix substrate 122 and the color filter substrate 124.

Figure 3:
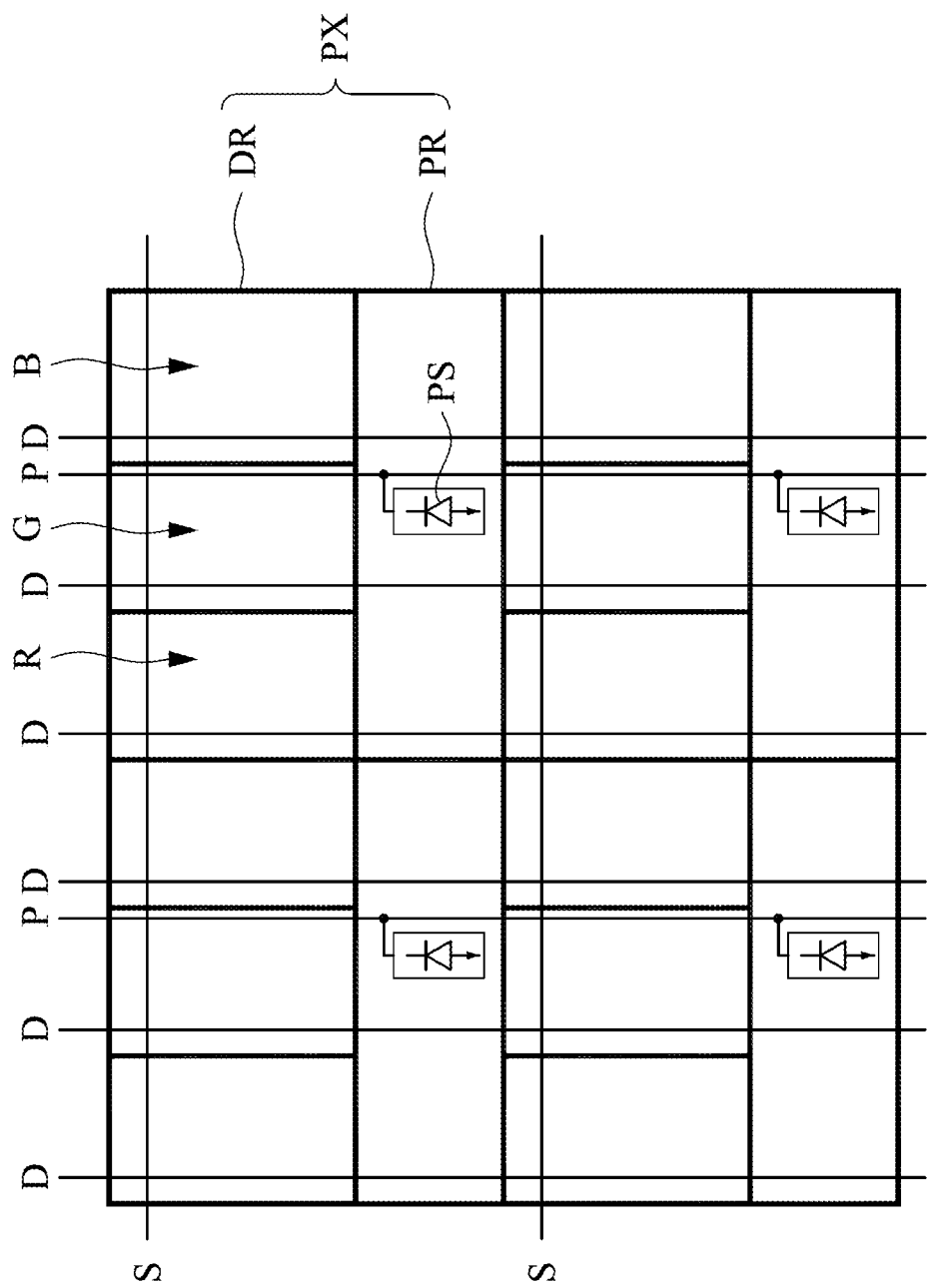
FIG. 3 is an exemplary partial top view of the active matrix substrate in FIG. 1.

Also referring to FIG. 3, which is an exemplary partial top view of the active matrix substrate 122 in accordance with some embodiments of the invention. As shown in FIG. 3, the active matrix substrate 122 has pixels PX that are arranged in a matrix in an active region of the display panel 120. Each of display and photo sensing pixels among the pixels PX includes a display region DR and a photo sensing region PR. That is, some of the pixels PX are display and photo sensing pixels arranged in photo sensing channels and each including a display region DR and a photo sensing region PR. The number of the display and photo sensing pixels may be less than or equal to the number of the pixels PX. The display region DR is configured to emit light for display and biometric detection according to the backlight and statuses of the electrical components in the corresponding subpixels. Each display region includes three subpixels, such as red, green and blue subpixels (respectively labeled by R, G and B). Each subpixel is associated with a data line D and a scan line S. That is, each subpixel receives a data signal from a corresponding data line D and a scan signal from a corresponding scan line S.

Figure 4:
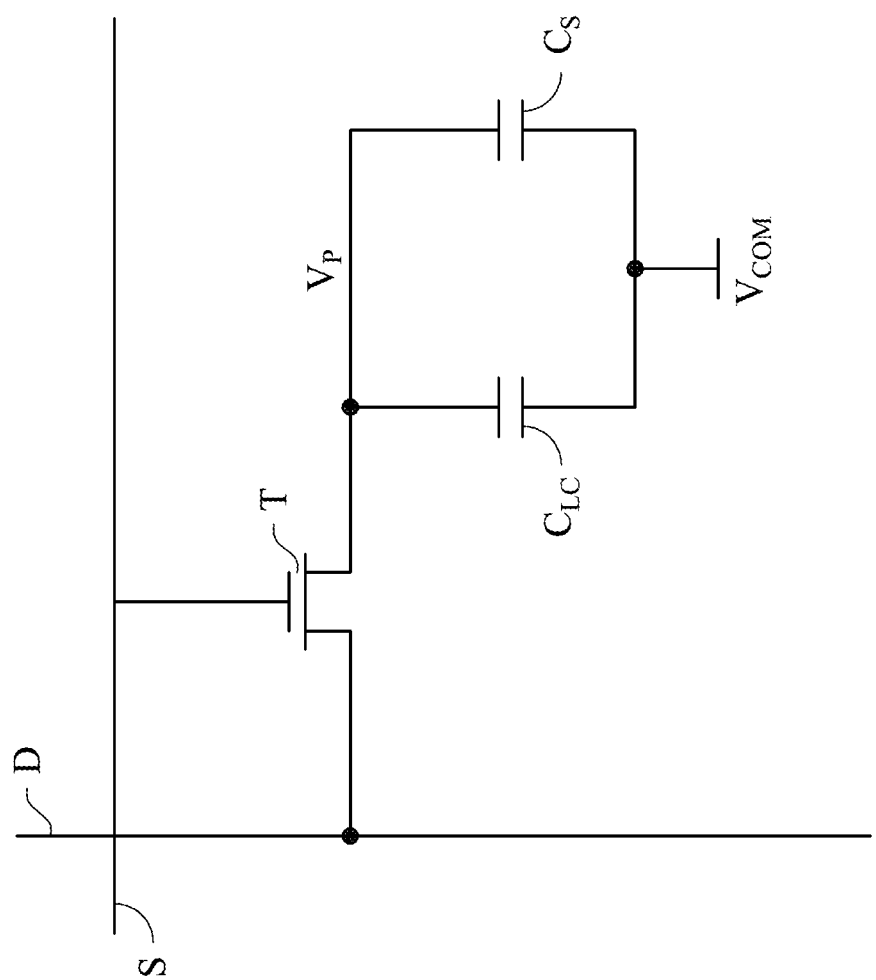
FIG. 4 is an equivalent circuit diagram of each subpixel in the display panel in FIG. 1.

Also referring to FIG. 4, which is an exemplary equivalent circuit diagram of each subpixel in the display panel 120. Each subpixel has a transistor T, a liquid crystal capacitor $C_{LC}$ and a storage capacitor $C_S$. The transistor T is coupled to the data line D and the scan line S for controlling a display period and a gray level in each frame period. The transistor T can be of any type, such as thin film transistor (TFT) or the like. The liquid crystal capacitor $C_{LC}$ and the storage capacitor $C_S$ are connected in parallel and are electrically connected to the transistor T. The liquid crystal capacitor $C_{LC}$ is formed form a pixel electrode of the active matrix substrate 122, a common electrode of the color filter substrate 124 and the liquid crystals of the liquid crystal layer 126 interposed between the pixel electrode and the common electrode. The storage capacitor $C_S$ is configured to store electrical charges during a pixel charge stage in which the pixel electrode and the common electrode are respectively written with a pixel voltage Vp and a common voltage $V_{COM}$.

Referring back to FIG. 3, each photo sensing region PR has a photo sensing circuit PS arranged therein for receiving light reflected from the display region DR and converting the received light into a photo detection signal. The photo sensing circuit PS is connected to a corresponding photo sensing line P for transmitting the photo detection signal to the detection circuit 130.

Referring back to FIG. 1, the detection circuit 130 is coupled to the display panel 120 to receive the photo detection signals and then performs an operation on the photo detection signals to construct a biometric pattern corresponding to the biometric object. The biometric pattern corresponds to the biometric object in accordance with various embodiments. In some embodiments, the biometric pattern is a fingerprint pattern if the biometric object is a fingerprint of a human finger.

Figure 5:
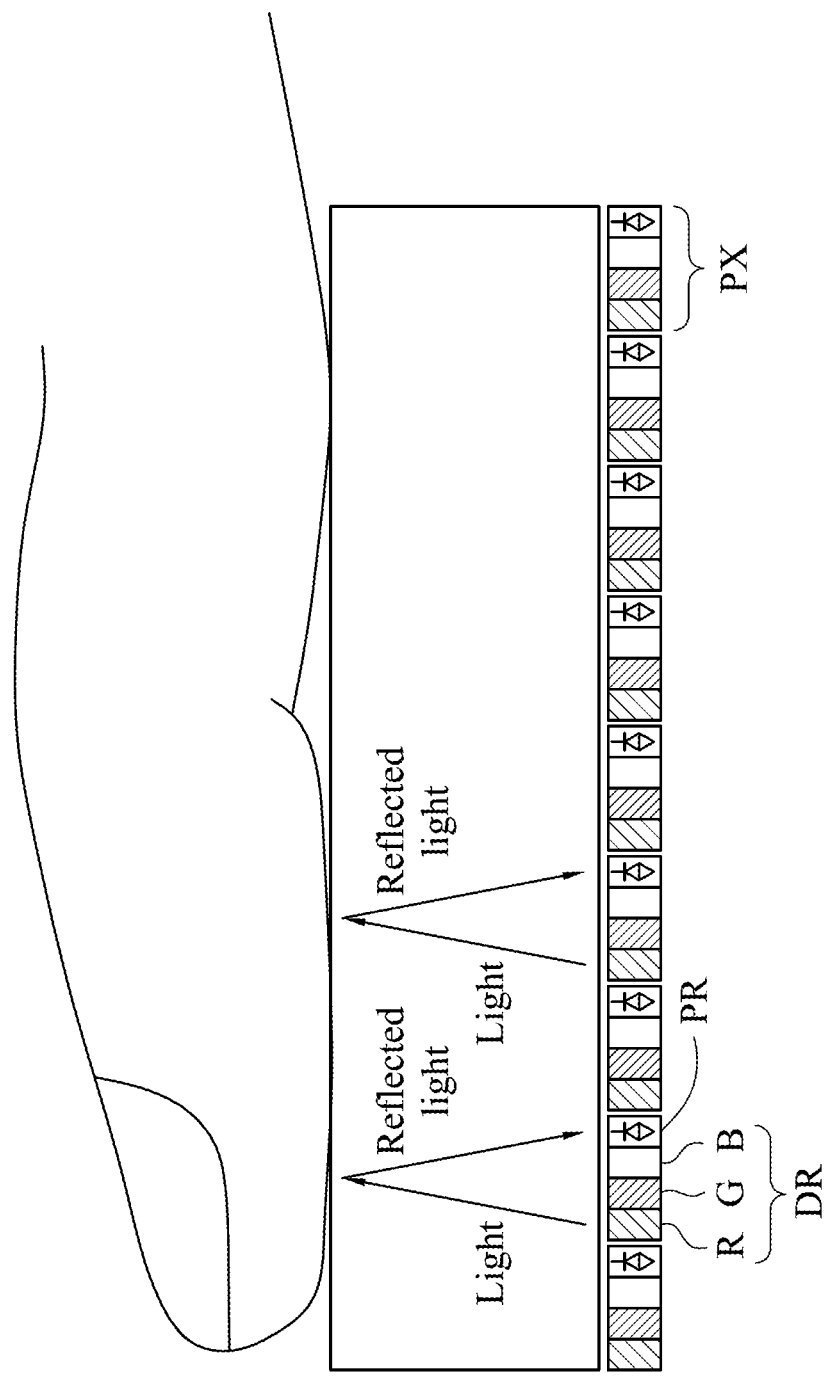
FIG. 5 exemplarily illustrates a biometric detection mechanism of the display device in FIG. 1.

FIG. 5 exemplarily illustrates a biometric detection mechanism of the display device 100. In the biometric detection mechanism, backlight emitted by the backlight module 110 penetrates through the red subpixel R, the green subpixel G and the blue subpixel B of the display region DR of each pixel PX and towards the upper surface of the display panel 120. For example, when a human finger presses on the upper surface of the display panel 120, the penetrated light is reflected by the human finger, and then the reflected light is received in the photo sensing region PR of each of the pixels PX. The reflected light received in the photo sensing region PR of a pixel PX may be originated from the light penetrating in the display region DR of the same pixel PX or different pixels PX. After receiving the reflected light, the photo sensing circuit PS in each photo sensing regions PR performs a light-electricity function, so as to convert the received light into the photo detection signals.

Figure 6:
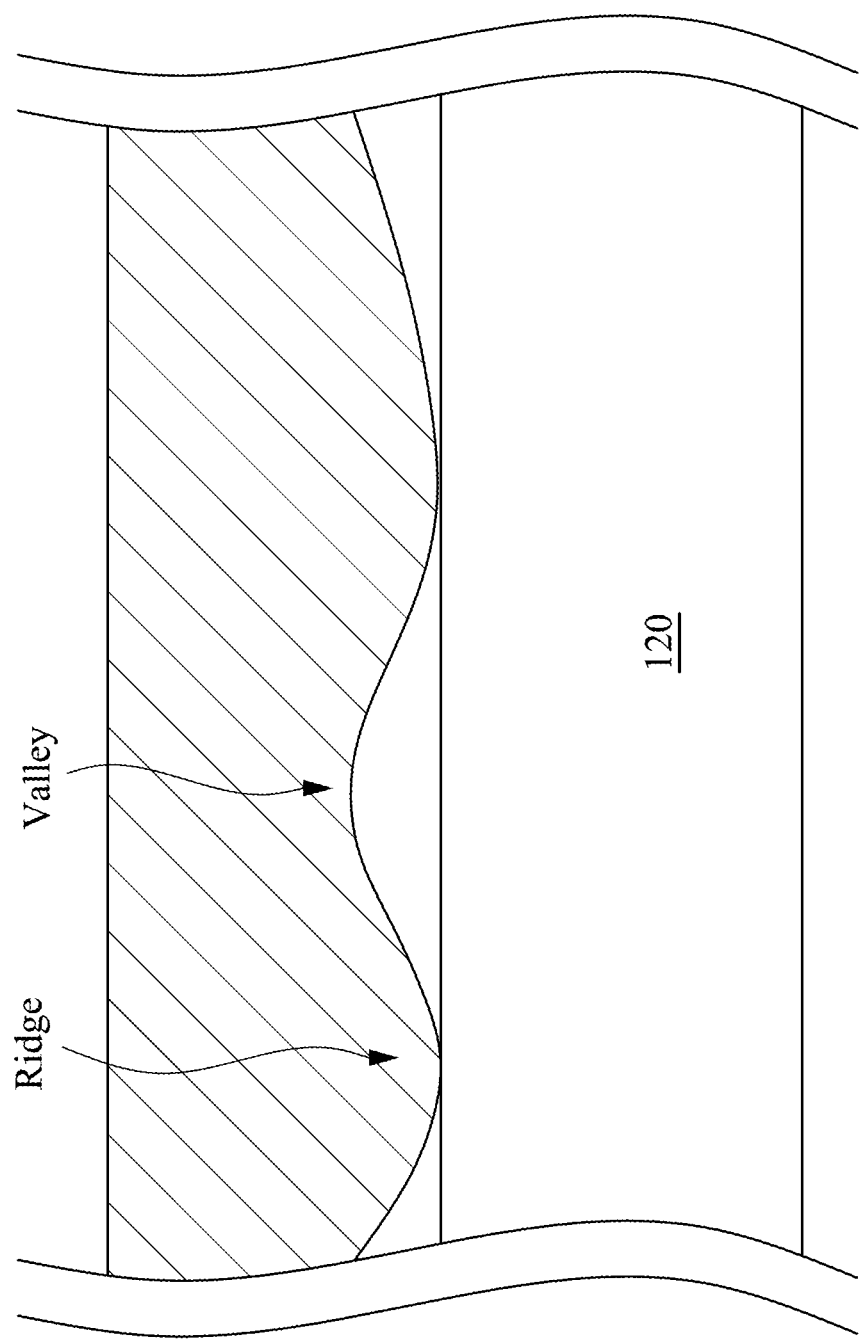
FIG. 6 exemplarily shows a human finger placed on the display panel in FIG. 1.

FIG. 6 exemplarily shows a human finger placed on the display panel 120. As shown in FIG. 6, when the human finger is placed on the display panel 120, the ridges touches the top surface of the display panel 120, and air gaps exist between the valleys and the top surface of the display panel 120. A fingerprint pattern of the human finger may be determined based on the abovementioned difference. In some embodiments, the reflected light corresponding to the valley is stronger than the reflected light corresponding to the ridge.

Figure 7A:
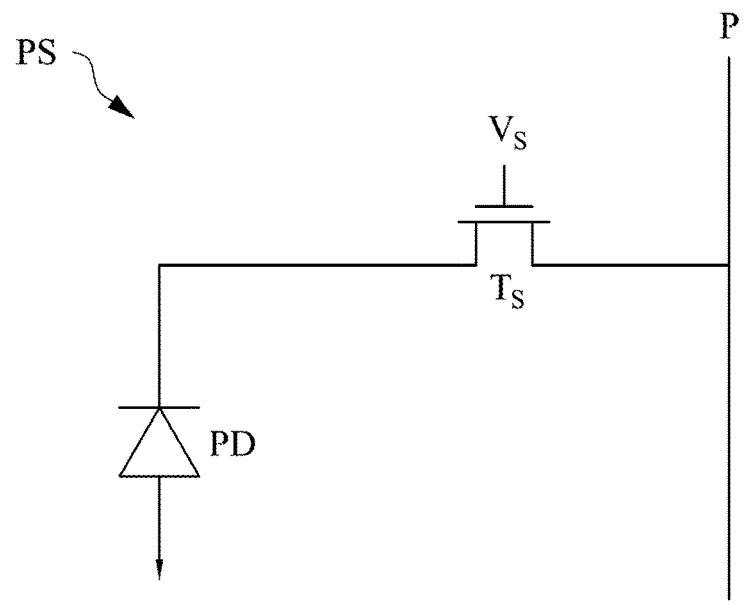
FIG. 7A is an exemplary equivalent circuit diagram of the photo sensing circuit in FIG. 3.

FIG. 7A is an exemplary equivalent circuit diagram of the photo sensing circuit PS. In FIG. 7A, the photo sensing circuit PS includes a photodiode PD and a select transistor $T_S$. In the photodiode PD, the anode is coupled to a reference voltage terminal (e.g. the ground), and the cathode is coupled to a first source/drain of the select transistor T. In addition to the first source/drain, the select transistor $T_S$ further includes a second source/drain coupled to the corresponding photo sensing line P and a gate configured to receive a control signal $V_S$. The equivalent circuit diagram shown in FIG. 7A is an active photo sensing circuit which is read out without amplification.

Figure 7B:
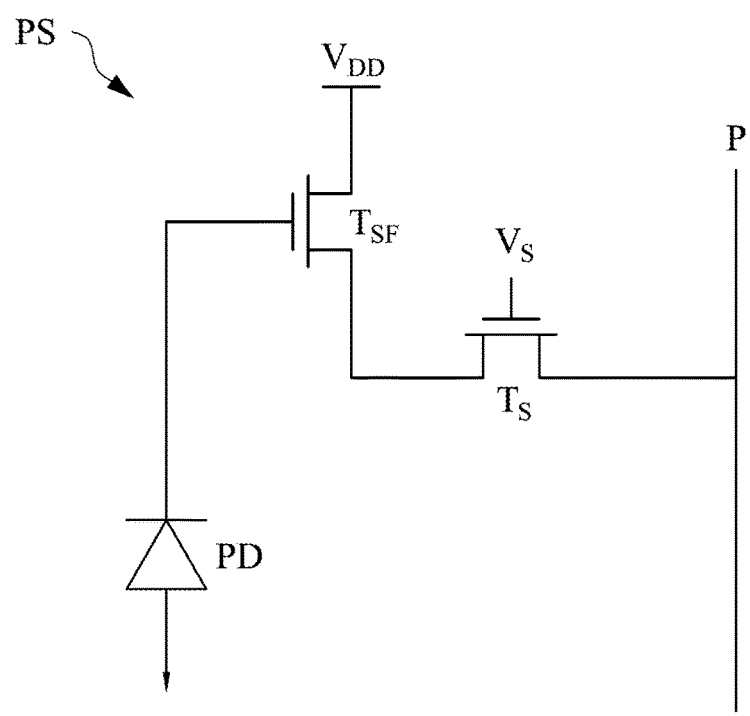
FIG. 7B is another exemplary equivalent circuit diagram of the photo sensing circuit in FIG. 3.

FIG. 7B is another equivalent circuit diagram of the photo sensing circuit PS. In FIG. 7B, the photo sensing circuit PS includes a photodiode PD and a select transistor $T_S$ as well as a source follower transistor $T_{SF}$. In the photodiode PD, the anode is coupled to a reference voltage terminal (e.g. the ground), and the cathode is coupled to a gate of the source follower transistor $T_{SF}$. The first source/drain and the second source/drain of the source follower transistor $T_{SF}$ are respectively coupled to a power supply terminal $V_{DD}$ and a first source/drain of the select transistor $T_S$. In addition to the first source/drain, the select transistor $T_S$ further includes a second source/drain coupled to the corresponding photo sensing line P and a gate configured to receive a control signal $V_S$. The equivalent circuit diagram shown in FIG. 7B is an active photo sensing circuit which is read out with amplification.

Figure 8:
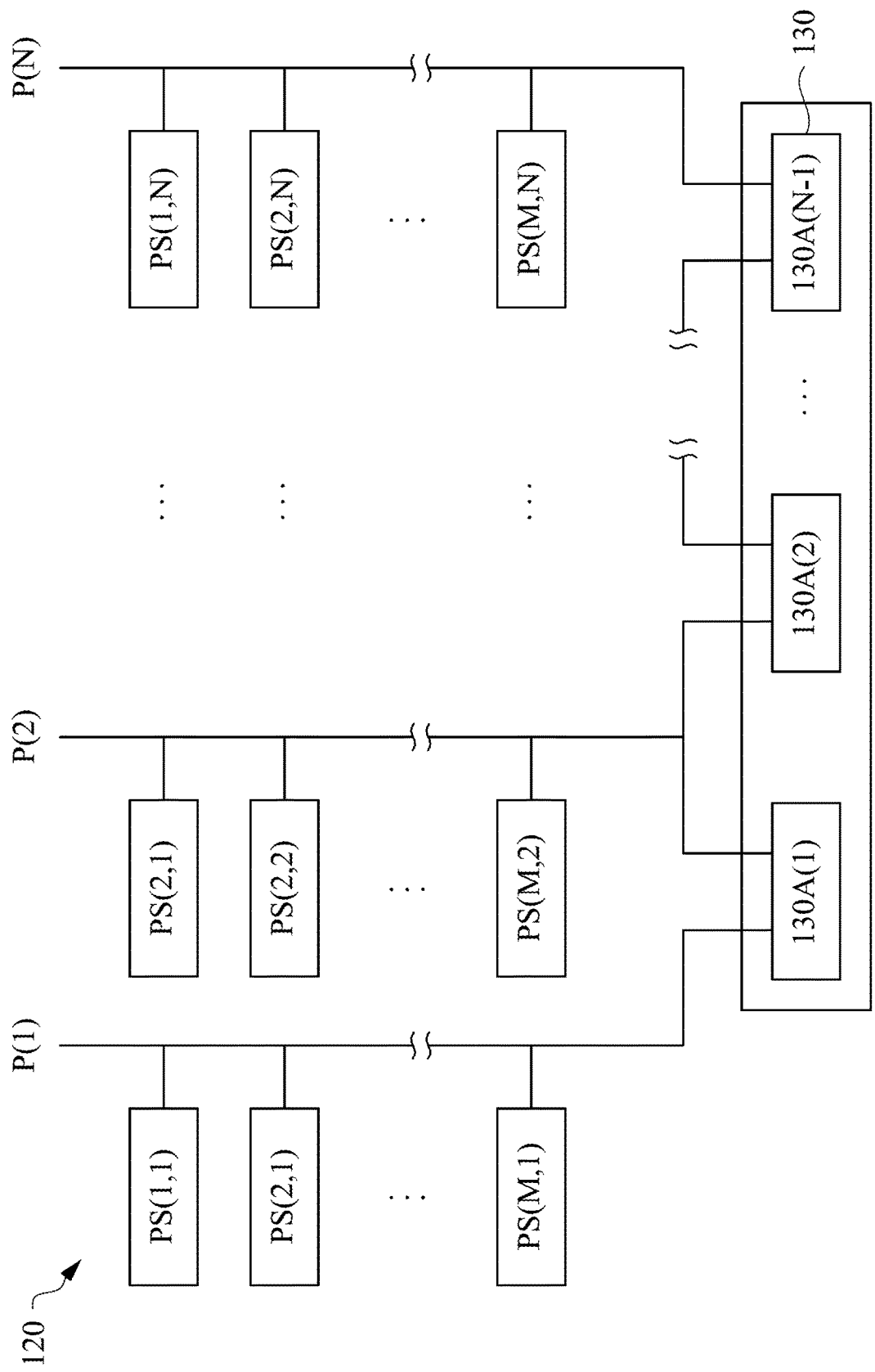
FIG. 8 is an exemplary schematic diagram of photo sensing circuits in the display panel and the detection circuit in FIG. 1 for biometric detection.

FIG. 8 is an exemplary schematic diagram of photo sensing circuits PS(1,1)-PS(M,N) in the display panel 120 and the detection circuit 130 for biometric detection. The photo sensing circuits PS(1,1)-PS(M,N) may be similar the photo sensing circuit PS in FIG. 3, and may be respectively arranged in particular pixels PX. In the exemplary example shown in FIG. 8, the photo sensing circuits PS(1,1)-PS(M,N) are arranged in an array of M rows and N columns. The N columns of the photo sensing circuits PS(1,1)-PS(M,N) are respectively coupled to photo sensing lines P(1)-P(N) associated with the photo sensing channels. The photo sensing circuits PS(1,1)-PS(M,N) in the same column are coupled to the same photo sensing line P(1)-P(N). For example, the photo sensing circuits PS(1,1), PS(2,1), . . . , PS(M,1) in the first column are coupled to the photo sensing line P(1). The detection circuit 130 includes differential signal processing circuitries 130A(1)-130A(N−1) each coupled to adjacent two of the photo sensing lines P(1)-P(N). That is, the differential signal processing circuitry 130A(1) is coupled to the photo sensing lines P(1) and P(2), and the differential signal processing circuitry 130A(2) is coupled to the photo sensing lines P(2) and P(3), and so on.

Figure 9:
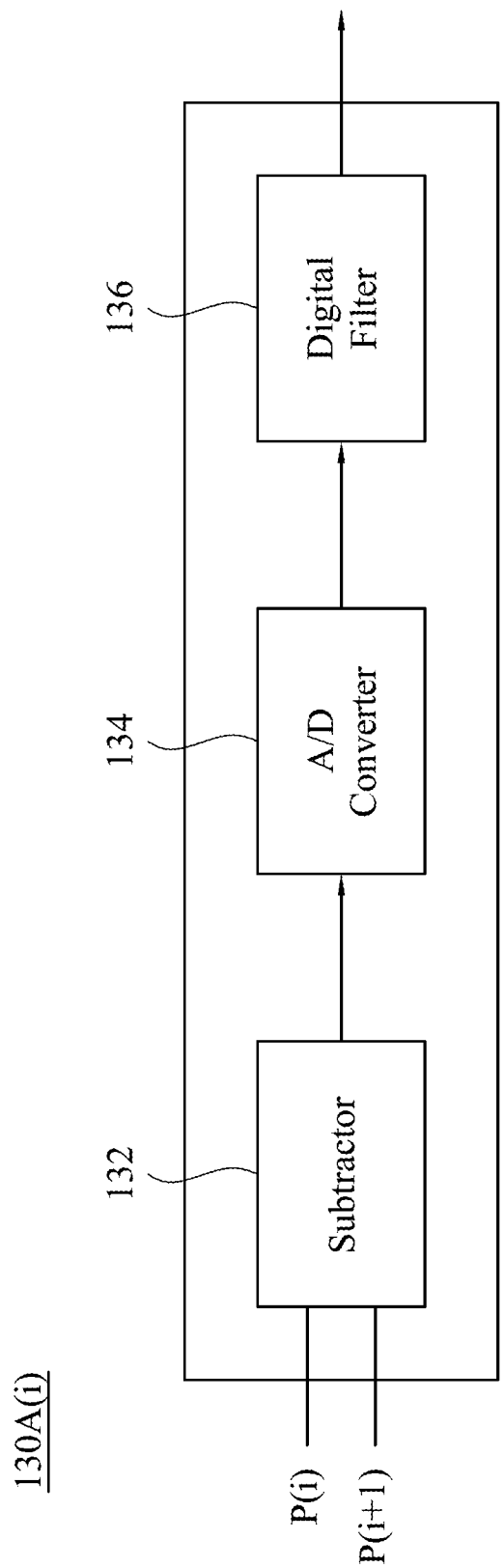
FIG. 9 is a schematic block diagram of each differential signal processing circuitry in FIG. 8 in accordance with some embodiments of the invention.

FIG. 9 is a schematic block diagram of the differential signal processing circuitry 130A(i) in accordance with some embodiments of the invention, where i is an integer from 1 to (N−1). The differential signal processing circuitry 130A(i) includes a subtractor 132, an analog-to-digital (A/D) converter 134 and a digital filter 136. The subtractor 132 has first and second input terminals respectively coupled to the photo sensing lines P(i) and P(i+1) for performing a differential operation on to signal. Depending on various design requirements, the first and second input terminals of each subtractor 132 may respectively be positive and negative input terminals, or may be respectively be negative and positive input terminals. The subtractor 132 may be a differential amplifier or another circuitry suitable for performing a differential operation on the photo detection signals respectively from the photo sensing lines P(i) and P(i+1). The A/D converter 134 is coupled to an output of the subtractor 132, and converts the difference signal outputted by the subtractor 132 from an analog form to a digital form. The digital filter 136 is used to define regions corresponding to two opposite characteristics of the biometric object to generate a biometric image, e.g. by enhancing the difference signal from the photo detection signals respectively corresponding to the two opposite characteristics.

Figure 10:
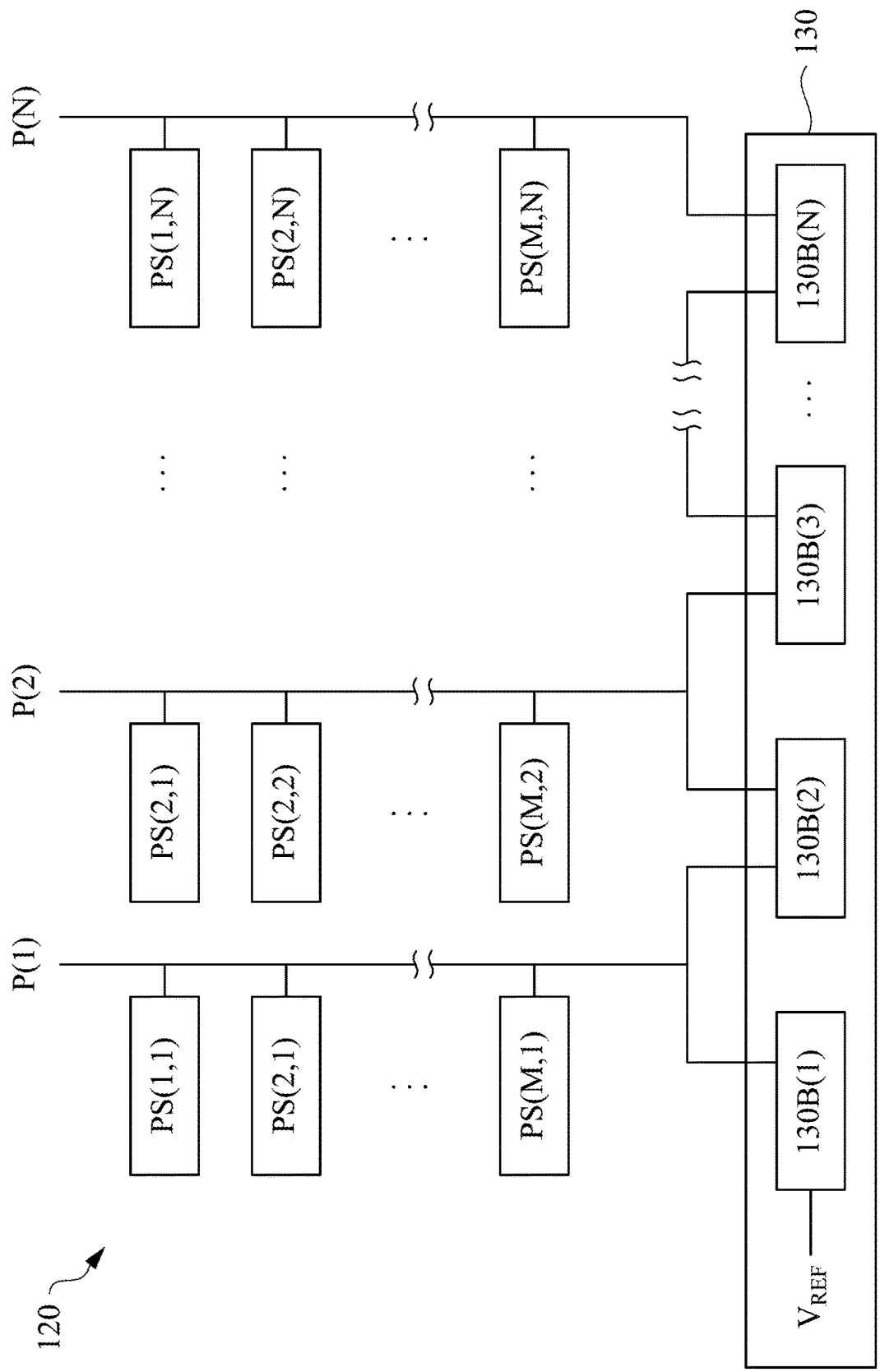
FIG. 10 is another exemplary schematic diagram of photo sensing circuits in the display panel and the detection circuit 130 in FIG. 1 for biometric detection.

FIG. 10 is another exemplary schematic diagram of the photo sensing circuits PS(1,1)-PS(M,N) in the display panel 120 and the detection circuit 130 for biometric detection. In comparison with the schematic diagram shown in FIG. 8, in FIG. 10, the detection circuit 130 includes differential signal processing circuitries 130B(1)-130B(N); the differential signal processing circuitry 130B(1) is coupled to a reference voltage terminal VR for providing a voltage reference signal $V_{REF}$ and the photo sensing line P(1), and each of the differential signal processing circuitries 130B(2)-130B(N) is coupled to adjacent two of the photo sensing lines P(1)-P(N), i.e., the differential signal processing circuitry 130B(2) is coupled to the photo sensing lines P(1) and P(2), and the differential signal processing circuitry 130B(3) is coupled to the photo sensing lines P(2) and P(3), and so on. Each of the differential signal processing circuitries 130B(1)-130B(N) may have a schematic block diagram similar to that of the differential signal processing circuitry 130A(i) shown in FIG. 9, and thus detailed descriptions thereof are omitted herein.

Figure 11A:
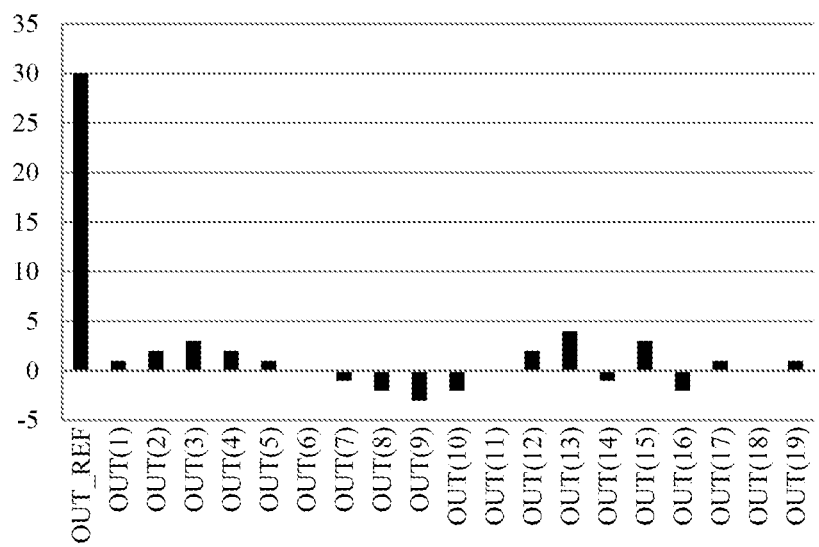
FIG. 11A is an experiential biometric detection result of the display device in FIG. 1 with the exemplary example shown in FIG. 10.
Figure 11B:
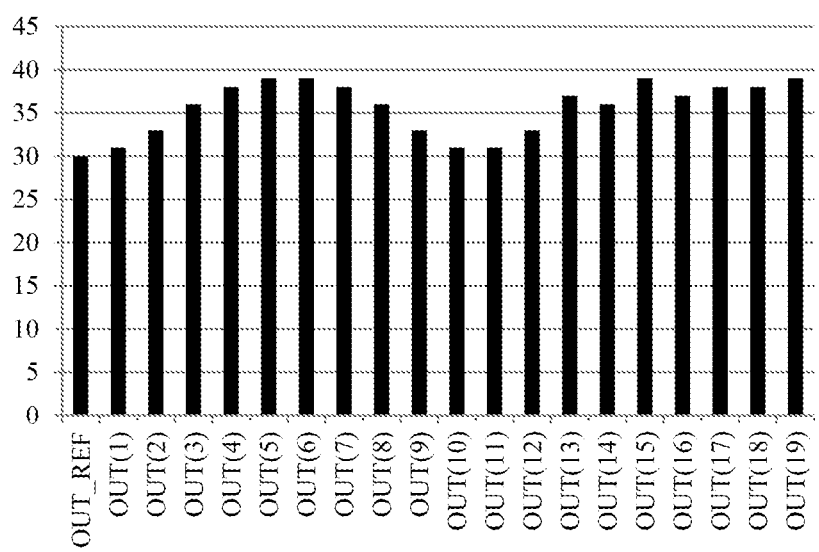
FIG. 11B is an experiential biometric detection result of the display device in FIG. 1 with the exemplary example shown in FIG. 10 after accumulative operations on the output reference signal and the output signals in FIG. 11A.
Figure 11C:
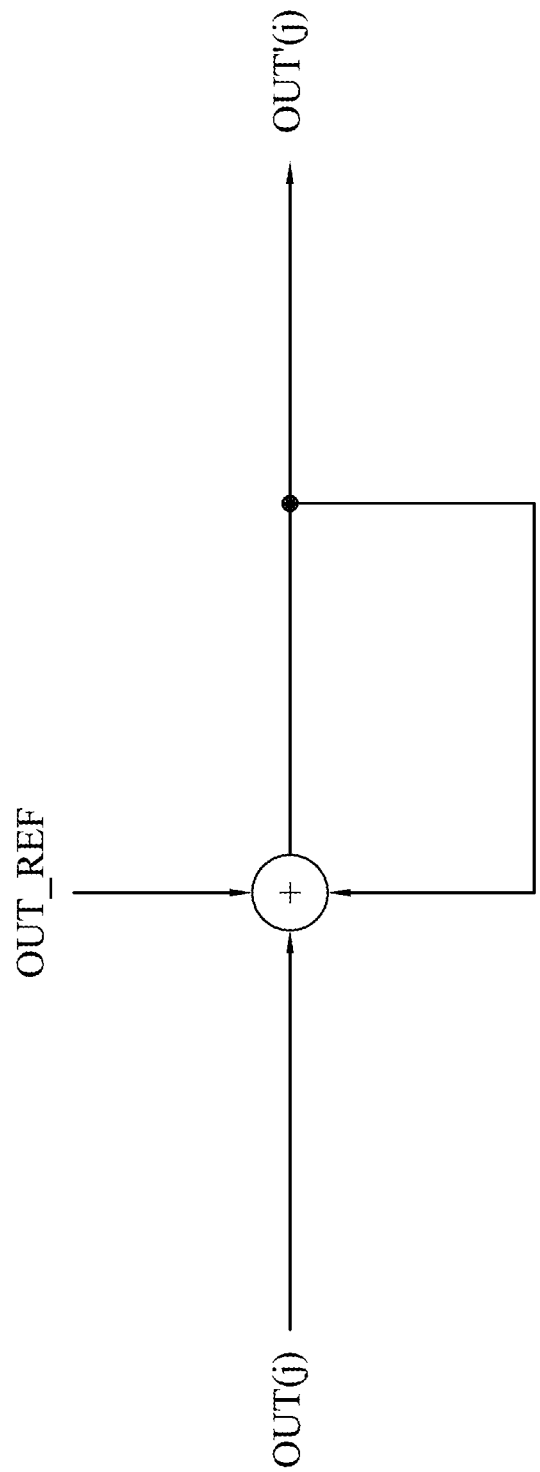
FIG. 11C exemplarily shows a circuit diagram of an accumulator.

FIG. 11A is an experiential biometric detection result of the display device 100 with the exemplary example shown in FIG. 10 for one of the rows of photo sensing circuits PS(1,1)-PS(M,N) in which N is 20. The signals outputted by the differential signal processing circuitries 130B(1)-130B(20) are respectively denoted as an output reference signal OUT_REF and difference signals OUT(1)-OUT(19). The difference signals OUT(1)-OUT(19) indicate change of the detected light intensities from the first column to the 20$^{th}$ column of the photo sensing circuits PS(1,1)-PS(M,N). If the output reference signal OUT_REF and the difference signals OUT(1)-OUT(19) are further processed by another circuitry of the detection circuit 130 (e.g. an accumulator), as shown in FIG. 11B, the output signals OUT'(1)-OUT'(19) are generated by performing accumulative operations on the output reference signal OUT_REF and the difference signals OUT(1)-OUT(19). Each output signal OUT'(j) (where j is an integer from 1 to 19) may be expressed by the equation OUT'(j)=OUT_REF+$\Sigma_{k=1}^{j}$OUT(k) which can be implement by a circuit diagram exemplarily shown in FIG. 11C. By performing the above accumulative operation, the photo detection signals on the photo sensing lines P(1)-P(20) relative to the voltage reference signal $V_{REF}$ are restored, and the biometric pattern corresponding to the biometric object can be constructed accordingly.

Figure 12:
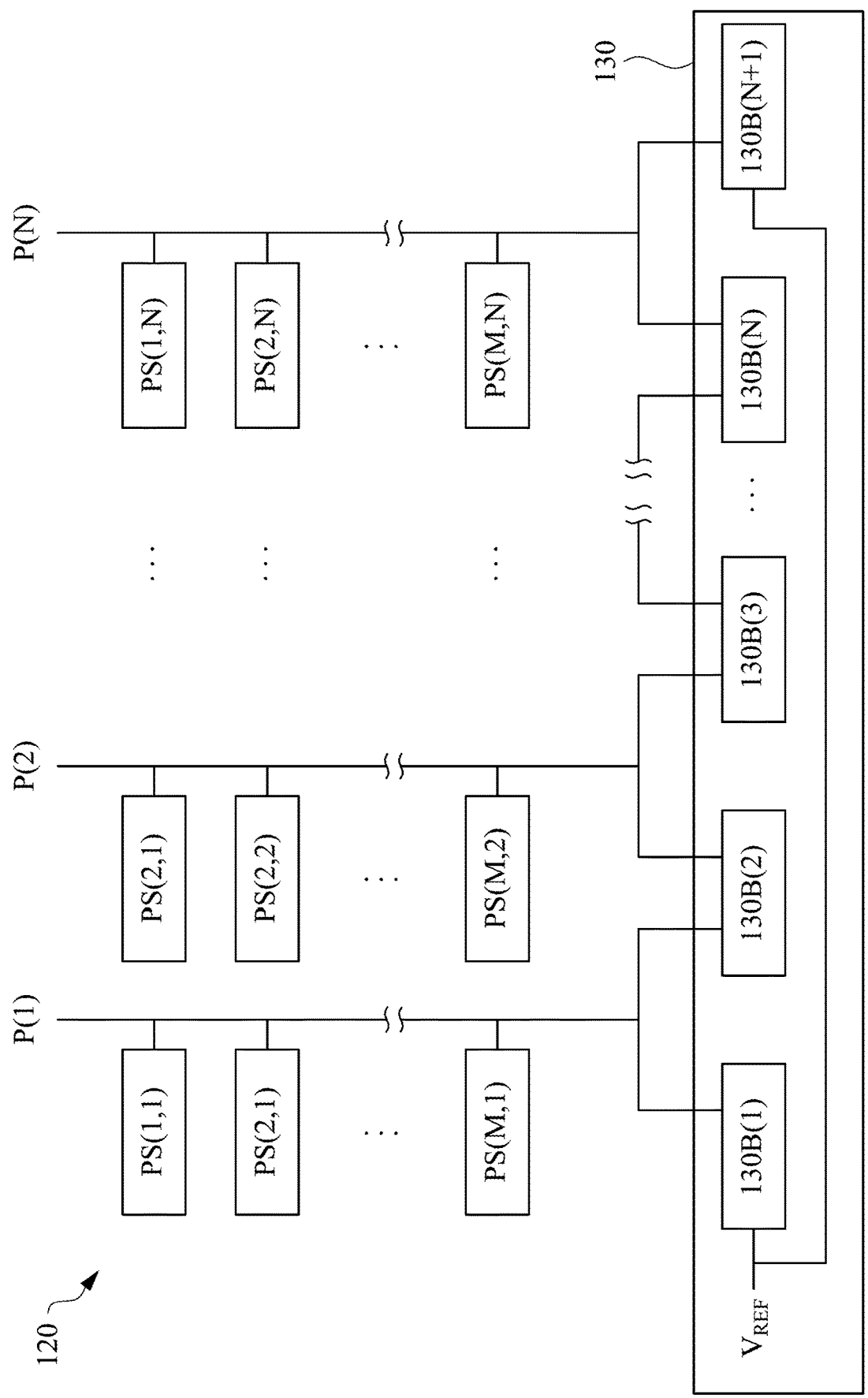
FIG. 12 is yet another exemplary schematic diagram of photo sensing circuits in the display panel and the detection circuit 130 in FIG. 1 for biometric detection.

FIG. 12 is another exemplary schematic diagram of the photo sensing circuits PS(1,1)-PS(M,N) in the display panel 120 and the detection circuit 130 for biometric detection. In comparison with the schematic diagram shown in FIG. 10, in addition to the differential signal processing circuitries 130B(1)-130B(N), the detection circuit 130 further includes a differential signal processing circuitry 130B(N+1) that is coupled to the photo sensing line P(N) and the reference voltage terminal VR. The differential signal processing circuitry 130B(N+1) may also have a schematic block diagram similar to that of the differential signal processing circuitry 130A(i) shown in FIG. 9. In some embodiments where the subtractors of the differential signal processing circuitries 130B(1)-130B(N+1) are differential amplifiers, the output signals of the differential signal processing circuitries 130B(1) and 130B(N+1) may also be used to detect gain errors of the processing circuitries 130B(1)-130B(N+1) due to process variations on the display device 100.

Figure 13A:
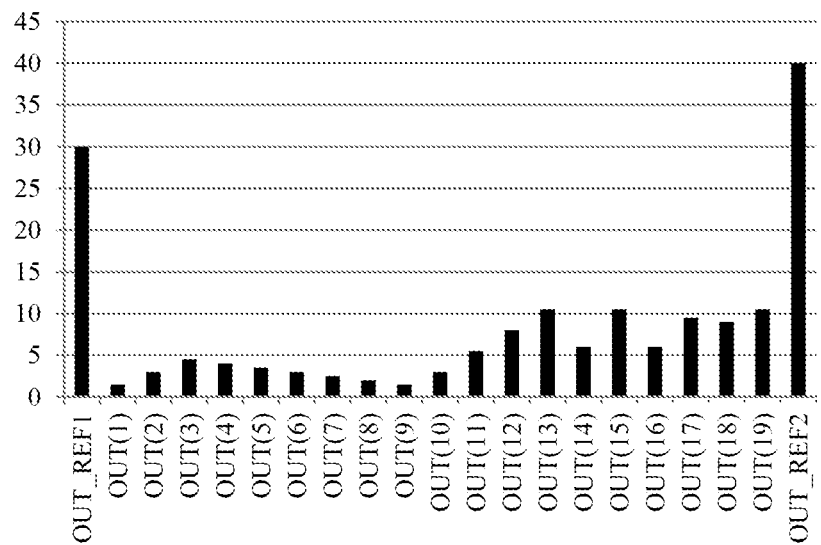
FIG. 13A is an experiential biometric detection result of the display device in FIG. 1 with the exemplary example shown in FIG. 12.

FIG. 13A is an experiential biometric detection result of the display device 100 with the exemplary example shown in FIG. 12 for one of the rows of photo sensing circuits PS(1,1)-PS(M,N) in which N is 20. The signals outputted by the differential signal processing circuitries 130B(1)-130B(21) are respectively denoted as a first output reference signal OUT_REF1, difference signals OUT(1)-OUT(19) and a second output reference signal OUT_REF2. As shown in FIG. 13A, the values of the first and second output reference signals OUT_REF1, OUT_REF2 are not identical, which would result in biometric pattern construction errors if the first output reference signal OUT_REF1, the difference signals OUT(1)-OUT(19) and the second output reference signal OUT_REF2 are directly used for subsequent operations.

Figure 13B:
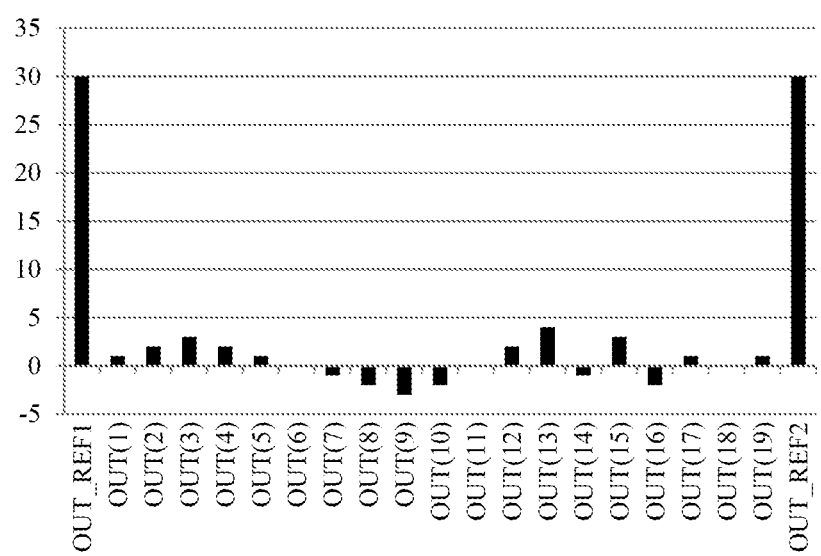
FIG. 13B is an experiential biometric detection result of the display device in FIG. 1 with the exemplary example shown in FIG. 12 after accumulative operations on the output reference signal and the output signals in FIG. 13A.
Figure 13C:
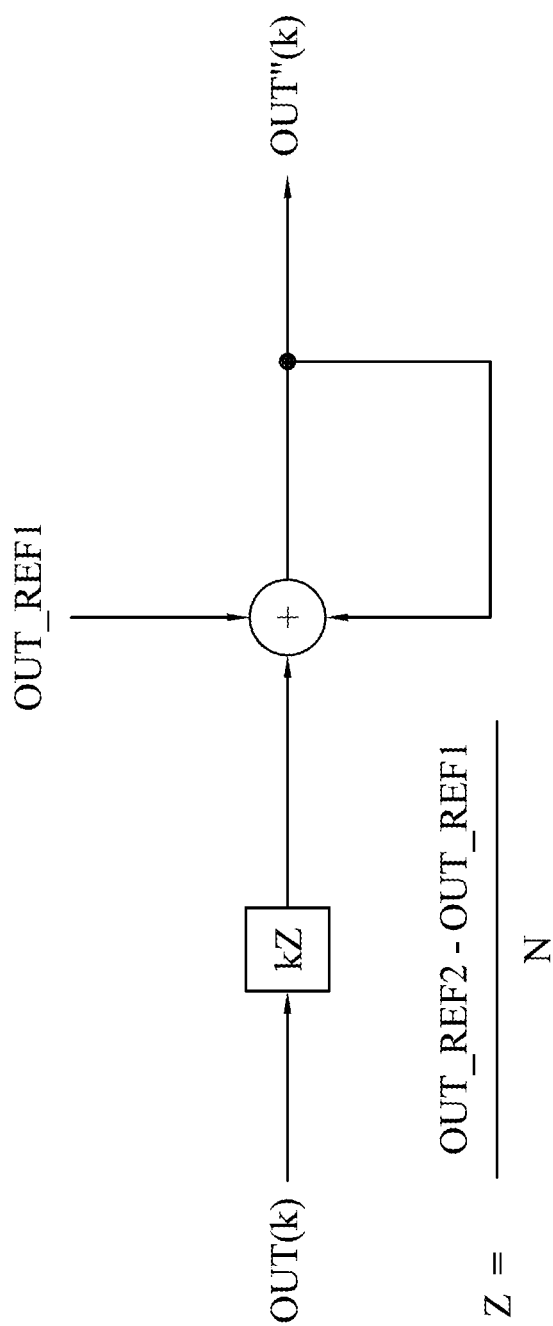
FIG. 13C exemplarily shows a circuit diagram for interpolating operations.

In order to solve the problems of gain errors of the processing circuitries 130B(1)-130B(N+1), in some embodiments, the detection circuit 130 may further include an interpolator for performing interpolating operations on the output signals of the differential signal processing circuitries 130B(1)-130B(N+1). For the experiential biometric detection result shown in FIG. 13A, the interpolator may perform interpolating operations on the difference signals OUT(1)-OUT(19) into output signals OUT"(1)-OUT"(19) by utilizing the equation OUT"(k)=OUT(k)+k(OUT_REF2−OUT_REF1)/N which can be implemented by a circuit diagram exemplarily shown in FIG. 13C (in this case, N is 20). As shown in FIG. 13B, after the interpolating processes, the values of the output signals OUT"(1)-OUT"(19) are identical to those of the difference signals OUT(1)-OUT(19) in FIG. 11A, and thus gain errors of the processing circuitries 130B(1)-130B(N+1) are compensated.

Furthermore, another circuitry (e.g. an accumulator) similar to that described in the above paragraphs relating to FIGS. 11A and 11B may be used to perform accumulative operations on the output reference signal OUT_REF and the output signals OUT"(1)-OUT"(19) to generate output signals OUT'(1)-OUT'(19) for restoring the photo detection signals on the photo sensing lines P(1)-P(20) relative to the voltage reference signal $V_{REF}$.

In addition to the display device 100 in FIG. 1, the detection circuit 130 may also be applied to another type display device. That is, the display panel 120 of the display device 100 may be another type display panel, such as an organic light-emitting diode (OLED) display panel or a micro light-emitting diode (µLED) display panel, of which a pixel arrangement is similar to that of the display panel 120.

Figure 14:
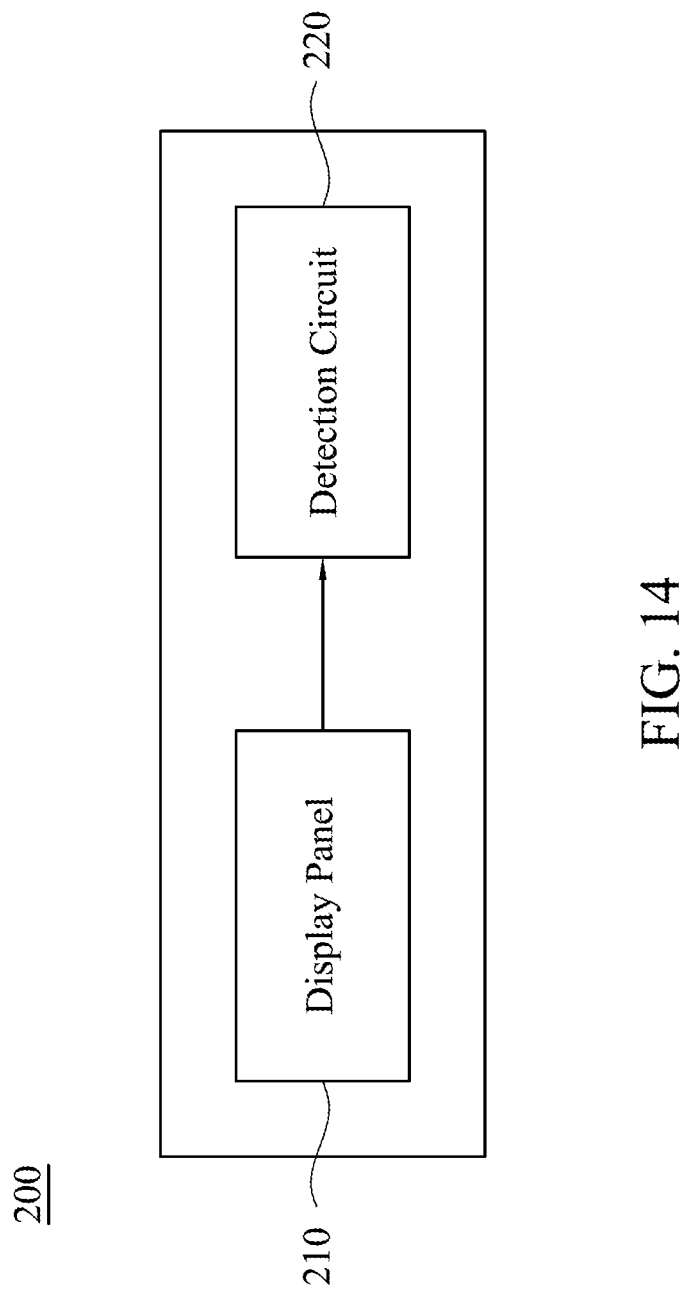
FIG. 14 is a schematic diagram of a display device in accordance with some embodiments of the invention.

Referring to FIG. 14, FIG. 14 is a schematic diagram of a display device 200 in accordance with some embodiments of the invention. The display device 200 includes a display panel 210 and a detection circuit 220. In comparison with the display device 100 in FIG. 1, the display panel 210 is a self-emitting display panel, and thus no additional backlight module is needed. For example, the display panel 210 may be an organic light-emitting diode (OLED) display panel, micro light-emitting diode (µLED) display panel or another similar display panel, of which the pixel arrangement is similar to that of the display panel 120. In the display panel 210, each subpixel may have one or more light emitting elements that are configured to emit light for display as well as biometric detection. The pixel arrangements for the display panel 210 may be similar to those of the display panel 120 in accordance with the embodiments described in the above paragraphs. The detection circuit 220 is configured to receive the photo detection signals from the display panel 210 and then performs an operation on the photo detection signals to construct a biometric pattern corresponding to the biometric object. Likewise, the structure and functions of the detection circuit 220 may be similar to those of the detection circuit 130 in accordance with the embodiments described in the above paragraphs.

Figure 15:
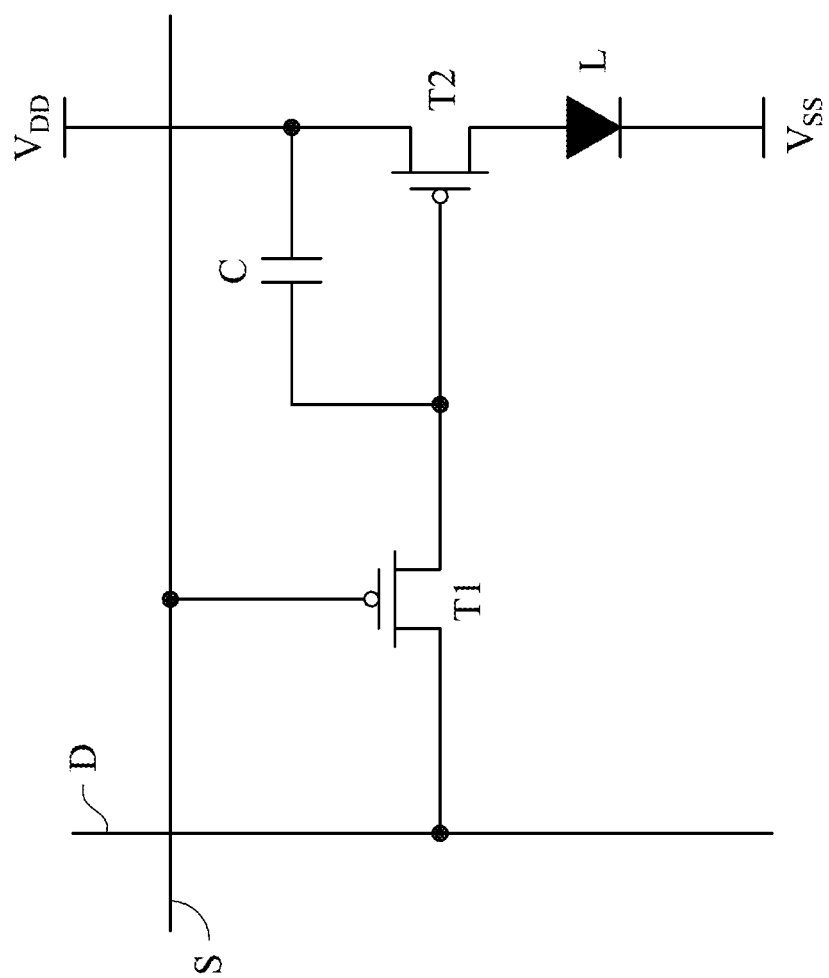
FIG. 15 is an equivalent circuit diagram of each subpixel in the display panel in FIG. 14.

Also referring to FIG. 15, which is an exemplary circuit diagram of each subpixel in the display panel 210. As shown in FIG. 15, each subpixel includes a data transistor T1, a driving transistor T2, a storage capacitor C and a light emitting element L. The data transistor T1 and the driving transistor T2 can be of any type, such as TFT or the like. In one example shown in FIG. 15, the data transistor T1 and the driving transistor T2 are PMOS transistors. A gate electrode of the data transistor T1 is coupled to a scan line S for receiving a scan signal, and a first source/drain electrode of the data transistor T1 is coupled to a data line D for receiving a data signal. A gate of the driving transistor T2 is coupled to a second source/drain electrode of the data transistor T1, and a first source/drain electrode is coupled to a power supply source $V_{DD}$. Two ends of the storage capacitor C are respectively coupled to the gate electrode and the first source/drain electrode of the driving transistor T2. An anode electrode of the light emitting element L is coupled to a second source/drain electrode of the driving transistor T2, and a cathode electrode of the light emitting element L is coupled to a reference voltage terminal $V_{SS}$ (e.g. the ground). The light emitting element L may be an OLED or an inorganic LED, such as a µLED, a mini-LED, or the like.

In summary, according to the embodiments of the invention described above, a biometric detection function is embedded in a display screen without requiring additional displacement in a non-active region for biometric detection and affecting original image display, thus providing more conveniently and flexibly. Particularly, the embodiments of the invention described above apply differential operations on the photo detection signals in units of adjacent two of the photo sensing channels, such that the noise generated in the photo sensing circuits and/or the touch sensing lines can be canceled, thus improving biometric detection accuracy.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:

1. A display device comprising:
   a display panel having a plurality of pixels that are configured to display an image, wherein the plurality of pixels comprise a plurality of display and photo sensing pixels that are arranged in a plurality of photo sensing channels, each of the plurality of display and photo sensing pixels comprising:
      a display region configured to emit light; and
      a photo sensing region adjacent to the display region, the photo sensing region configured to detect the light emitted by the display region and reflected from a biometric object and to convert the reflected light into photo detection signals; and
   a detection circuit comprising:
      a plurality of first differential signal processing circuitries that are coupled to the photo sensing regions of the display and photo sensing pixels, each of the first differential signal processing circuitries configured to perform a differential operation on the photo detection signals of adjacent two of the photo sensing channels to generate a difference signal that is used to construct a biometric pattern corresponding to the biometric object;
      a second differential signal processing circuitry configured to perform a differential operation on a voltage reference signal and the photo detection signal of the first photo sensing channel of the photo sensing channels to generate a first output reference signal for constructing the biometric pattern; and
      an accumulator that is configured to perform accumulative operations on the first output reference signal and the difference signals to restore the photo detection signals relative to the voltage reference signal.

2. The display device of claim 1, wherein the detection circuit further comprises:
   a third differential signal processing circuitry configured to perform a differential operation on the voltage reference signal and the photo detection signal of the last photo sensing channel of the photo sensing channels to generate a second output reference signal for constructing the biometric pattern.

3. The display device of claim 2, wherein the detection circuit further comprises:
   an interpolator for performing interpolating operations on the difference signals based on the difference between the first and second output reference signals.

4. The display device of claim 1, wherein each of the first differential signal processing circuitries further comprises:
   an analog-to-digital (A/D) converter configured to convert the difference signal from an analog form to a digital form; and
   a digital filter coupled to an output of the A/D converter and configured to define regions corresponding to two opposite characteristics of the biometric object to generate a biometric image.

5. The display device of claim 1, wherein the photo sensing region is an active photo sensing region that comprises a photodiode, a source follower transistor and a select transistor.

6. The display device of claim 1, wherein the photo sensing region is a passive photo sensing region that comprises a photodiode and a select transistor.

7. The display device of claim 1, wherein the display panel is a liquid crystal display (LCD) panel, and the display device further comprises a backlight module that is configured to provide backlight to the LCD panel.

8. The display device of claim 1, wherein the pixels are organic light-emitting diode (OLED), micro light-emitting diode (μLED) pixels or mini-LED pixels.

9. A biometric detection method of a display device, the display device having a display panel with a plurality of pixels that are configured to display an image, the pixels comprising a plurality of display and photo sensing pixels that are arranged in a plurality of photo sensing channels, and the biometric detecting method comprising:
   emitting light by a display region of each of the display and photo sensing pixels;
   detecting the light emitted by the display region and reflected from a biometric object and to convert the reflected light into photo detection signals;
   performing first differential operations on the photo detection signals in units of adjacent two of the photo sensing channels to generate difference signals;
   performing a second differential operation on a voltage reference signal and the photo detection signal of the first photo sensing channel of the photo sensing channels to generate a first output reference signal;
   performing accumulative operations on the first output reference signal and the difference signals to restore the photo detection signals relative to the voltage reference signal; and
   constructing a biometric pattern corresponding to the biometric object based on the difference signals and the first output reference signal.

10. The biometric detection method of claim 9, further comprising:
   performing a third differential operation on the voltage reference signal and the photo detection signal of the last photo sensing channel of the photo sensing channels to generate a second output reference signal for constructing the biometric pattern; and
   constructing the biometric pattern corresponding to the biometric object based on the difference signals and the first and second output reference signals.

11. The biometric detection method of claim 10, wherein constructing the biometric pattern comprises:
   performing interpolating operations on the difference signals based on the difference between the first and second output reference signals.

* * * * *